(12) United States Patent
Chen

(10) Patent No.: US 6,247,556 B1
(45) Date of Patent: Jun. 19, 2001

(54) SCREW BOLT, NUT AND BALL BEARING ASSEMBLY

(75) Inventor: Kuan-Chun Chen, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 0 days.

(21) Appl. No.: 09/406,808

(22) Filed: Sep. 28, 1999

(30) Foreign Application Priority Data

Mar. 5, 1999 (TW) .................................. 88203320

(51) Int. Cl.$^7$ .................................. F16H 25/22; F16N 7/12
(52) U.S. Cl. .................. 184/83; 184/102; 74/424.8 R; 74/459; 74/467
(58) Field of Search ................... 74/89.15, 424.8 R, 74/459, 467; 184/87, 102

(56) References Cited

U.S. PATENT DOCUMENTS

| | | | | |
|---|---|---|---|---|
| 1,701,154 | * | 2/1929 | Gunn | ........................................ 184/87 |
| 3,132,719 | * | 5/1964 | Cole | ........................................ 184/65 |
| 4,795,172 | * | 1/1989 | Brande | ........................ 74/424.8 R X |
| 5,168,767 | * | 12/1992 | Morita | ................................ 74/459 X |
| 5,809,838 | * | 9/1998 | Miyaguchi et al. | .................... 74/459 |
| 6,125,968 | * | 10/2000 | Shirai | ................................ 184/102 X |

FOREIGN PATENT DOCUMENTS 6-159471 * 6/1994 (JP) .................................. 74/467 X

* cited by examiner

Primary Examiner—Richard M. Lorence
(74) Attorney, Agent, or Firm—Dougherty & Troxell

(57) ABSTRACT

The present invention discloses screw bolt and nut with lubricant oil contained ball bush bearing. There is a deep oil storage hole formed in the nut parallel to axial direction of the bolt for storing the lubricant oil. An oil nipple or an oil packing is provided at one end of the deep oil storage hole for preventing leakage of the lubricant oil. A threaded oil dripping hole intersecting the deep oil storage hole with an oil containing member therein is formed in the nut thereby causing the lubricant oil to drip gradually into the spiral grooves and lubricate the rolling balls thereof. The oil containing member can be made of felt, wool, cotton (cloth or thread) or the like. Furthermore, an oil adjusting screw is provided with the oil dripping hole for controlling the flow rate of lubricant oil into the spiral grooves.

6 Claims, 4 Drawing Sheets

SCREW BOLT, NUT AND BALL BEARING ASSEMBLY

BACKGROUND OF THE INVENTION

1. Field of the Invention

The present invention relates to screw bolt, nut and ball bearing assembly, and more particularly, a assembly for a screw bolt and nut in which lubricant oil is contained in the assembly. As a result, the screw bolt and nut can be operated without replenishing new lubricant oil for a long period of time.

2. Description of the Prior Art

In a ball bearing assembly, a plurality of steel balls are interposed between the bolt and nut serving for reducing frictional resistance to improve mechanical efficiency and save work energy. Although the amount of lubricant oil required for such a mechanism is little, yet if it operates in lack of lubrication for too long time, the screw bolt and nut will severely wear out. Since a conventional ball bearing for screw bolt and nut does not contain lubricant oil within itself. In such case, a separate automatic lubricating apparatus is provided, or the mechanism is manually lubricated. It is not only increasing equipment and operation cost, but also causing inconvenience to the user. In the case that the automatic lubricating apparatus becomes out of order or the operator forgets to infuse lubricant oil in time of need, the mechanism will be damaged.

SUMMARY OF THE INVENTION

Generally, a combination of screw bolt and nut with ball bearing has a spiral groove of semi-circular cross section formed along the outer surface of the screw bolt, and there is a spiral groove of circular cross section formed on the inner surface of a screw nut corresponding to that formed along the screw bolt. A plurality of rolling balls are interposed between the built and the nut and rolling in the pair of grooves thereby changing the sliding contact between bolt and nut to rotational contact therebetween.

It is a object of the present invention to provide screw bolt and nut with ball bearings in which lubricant oil is contained in the ball bearing, and the screw bolt and nut can be operated without replenishing new lubricant oil for a long period of time.

To achieve this object, the present invention provides a deep oil storage hole formed in the nut parallel to axial direction of the bolt for storing the lubricant oil. An oil nipple or an oil packing is provided at one end of the deep oil storage hole for preventing leakage of the lubricant oil. A threaded oil dripping hole intersecting the deep oil storage hole with an oil containing member therein is formed in the nut thereby causing the lubricant oil to drip gradually into the spiral grooves and lubricate the rolling balls thereof. The oil containing member can be made of felt, wool, cotton (cloth or thread ) or the like. Furthermore, an oil adjusting screw is provided with the oil dripping hole for controlling the flow rate of lubricant oil into the spiral grooves.

BRIEF DESCRIPTION OF THE DRAWINGS

The drawings disclose illustrative embodiments of the present invention which serve to exemplify the various advantages and objects hereof, and are as follows.

DETAILED DESCRIPTION OF THE PREFERRED EMBODIMENT

Figure 1:
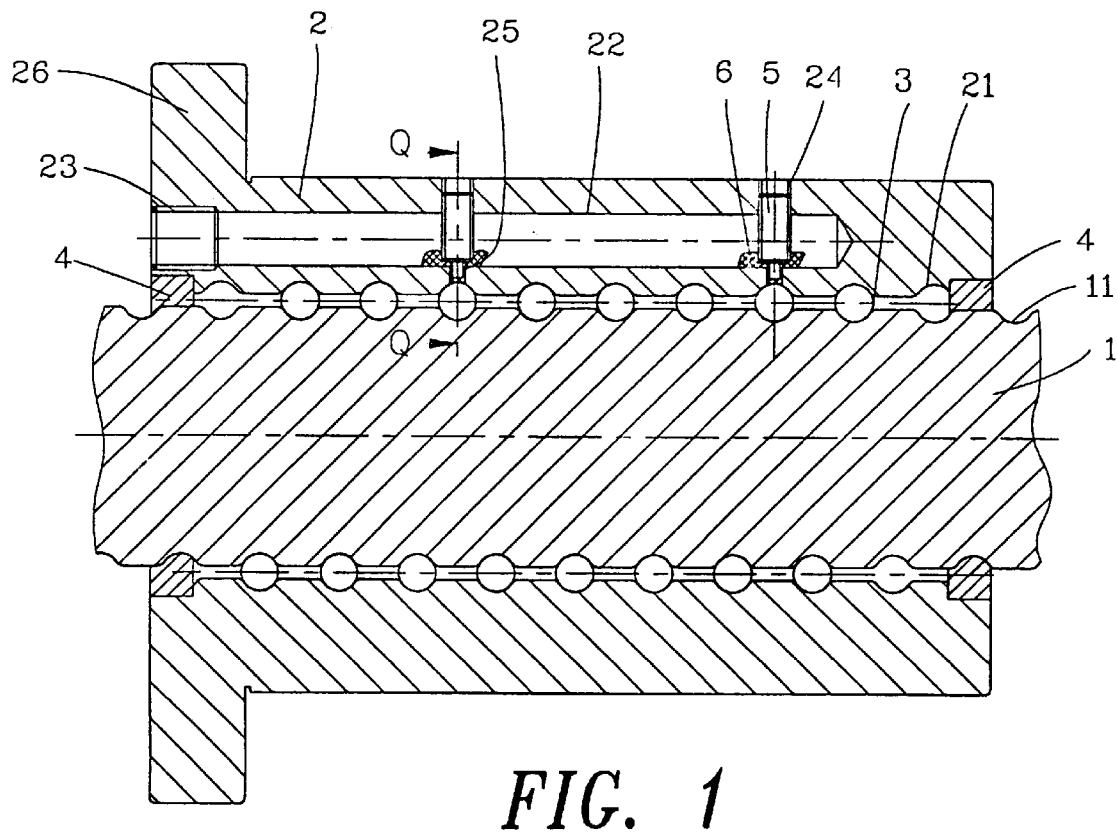
FIG. 1 is a drawing of the screw bolt and nut with lubricant oil contained ball bush bearing in a first embodiment of the present invention.
Figure 2:
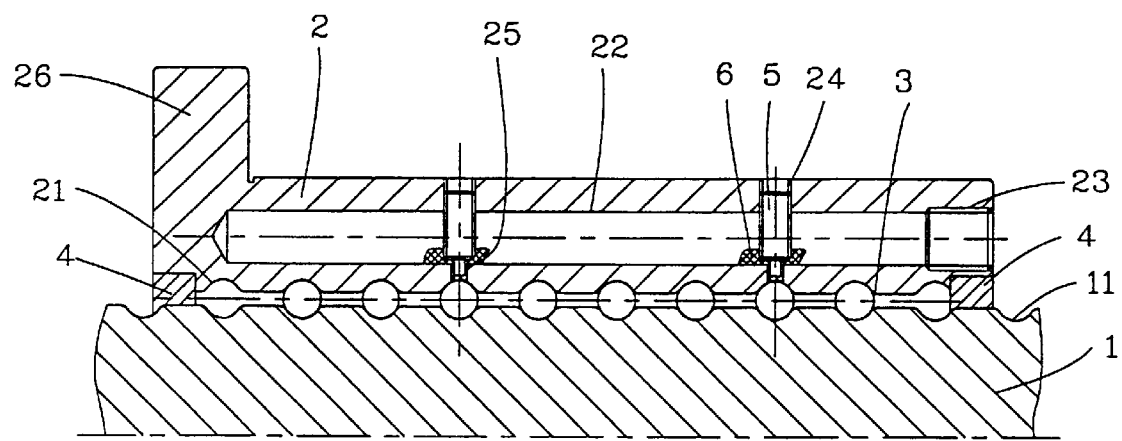
FIG. 2 is a drawing of the screw bolt and nut with lubricant oil contained ball bush bearing in a second embodiment of the present invention.

FIG. 1 shows a first embodiment of the present invention. Combination of screw bolt and nut with ball bearings comprises a screw bolt 1 with a spiral groove 11 of semi-circular-liked cross section formed along the outer surface thereof; and a hollow screw nut 2 combining with the bolt 1 with a spiral groove 21 of semi-circular cross section similar to and corresponding to the groove 11 formed on the inner surface thereof. A plurality of rolling balls 3 are interposed between the bolt 1 and the nut 2 and circulate along the pair of grooves 11, 21. A flange 26 is usually provided for facilitating assembly work. A scraping ring 4 is provided at each end surface of the nut 2 to clean up foreign materials and dust which happen to stick on the outer surface of the bolt 1. A deep oil storage hole 22 is formed in the nut 2 parallel to axial direction of the bolt 1 for storing lubricant oil. The outlet portion of the deep oil storage hole 22 is provided with threads 23 for engaging with an oil nipple or an oil packing for preventing leakage of lubricant oil from the ball bush bearing, and replenishing new lubricant oil in the case it is needed. An oil dripping hole 25 having an oil containing member 6 and intersecting the deep oil storage hole 22 is formed in the nut 2 thereby causing the lubricant oil to drip gradually into the spiral grooves 11, 12 and lubricate the rolling balls 3 thereof. Incidentally, the oil containing member 6 can be made of felt, wool, cotton (cloth or thread) or the like. Furthermore, the oil dripping hole 25 is provided with threads 24 and an oil adjusting screw 5. By adjusting a head 51 of the adjusting screw 5 in the oil dripping hole 25, the flow rate of lubricant oil into the spiral grooves 11, 21 can be controlled FIG. 2 is a drawing of a second embodiment of the present invention. It can be observed from the drawing that threads 23 for engaging the oil nipple or the oil packing are provided at the opposite end of FIG. 1.

Figure 3:
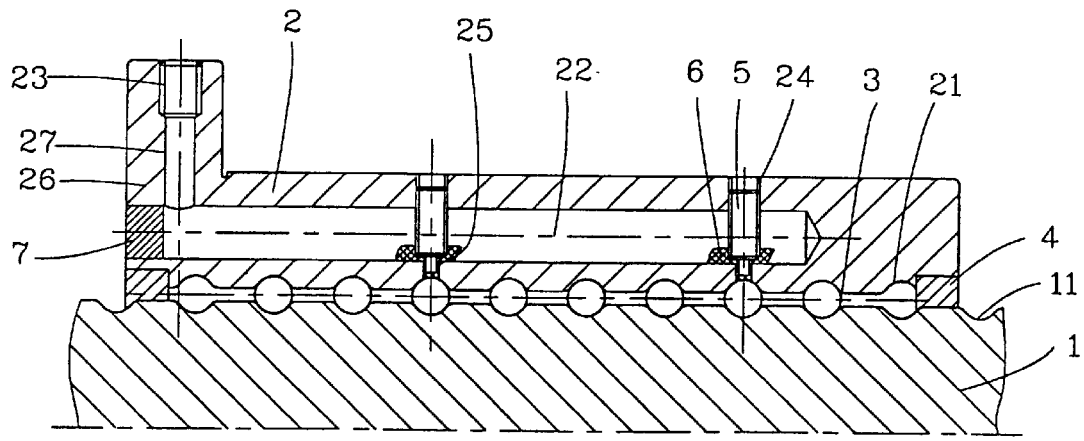
FIG. 3 is a drawing of the screw bolt and nut with lubricant oil contained ball bush bearing in a third embodiment of the present invention.

FIG. 3 is a drawing of third embodiment of the present invention. In this embodiment threads 23 for engaging the oil nipple or the oil packing are provided at the flange 26 of the nut 2. In order to enable the lubricant oil to flow into the deep oil storage hole 22 from the oil nipple, there is provided an oil direction changing hole 27. Besides, the deep oil storage hole 22 is sealed by an oil packing or a copper packing 7 from outside for preventing leakage of lubricant oil therein.

Figure 4:
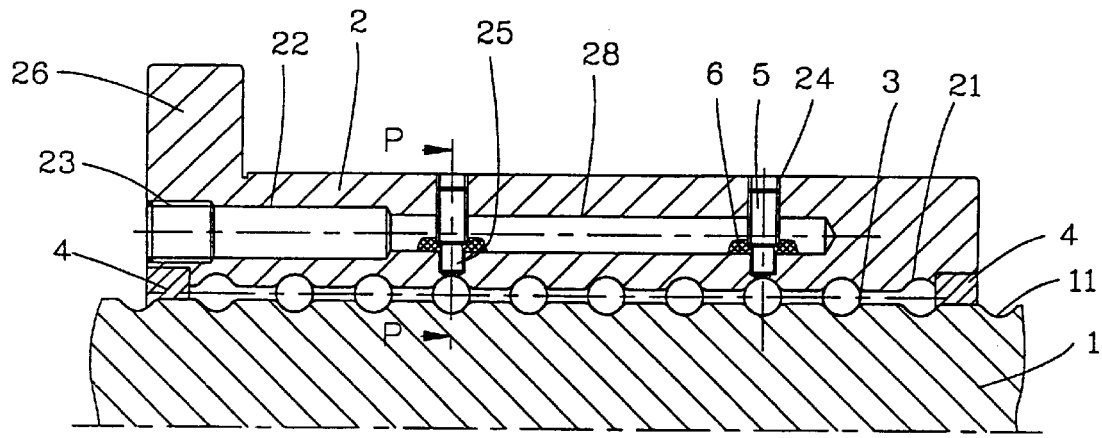
FIG. 4 is a drawing of the screw bolt and nut with lubricant oil contained ball bush bearing in a fourth embodiment of the present invention.

FIG. 4 is a drawing of fourth embodiment of the present invention. For fear of degrading the mechanical strength of the nut 2, if the deep oil storage hole 22 is bored in the nut 2, particularly in a nut 2 of smaller outer diameter, therefore, the depth of the deep oil storage hole 22 is reduced, and an additional oil guide hole 28 is formed to connect the deep oil storage hole 22 with the oil dripping hole 25.

Figure 5:
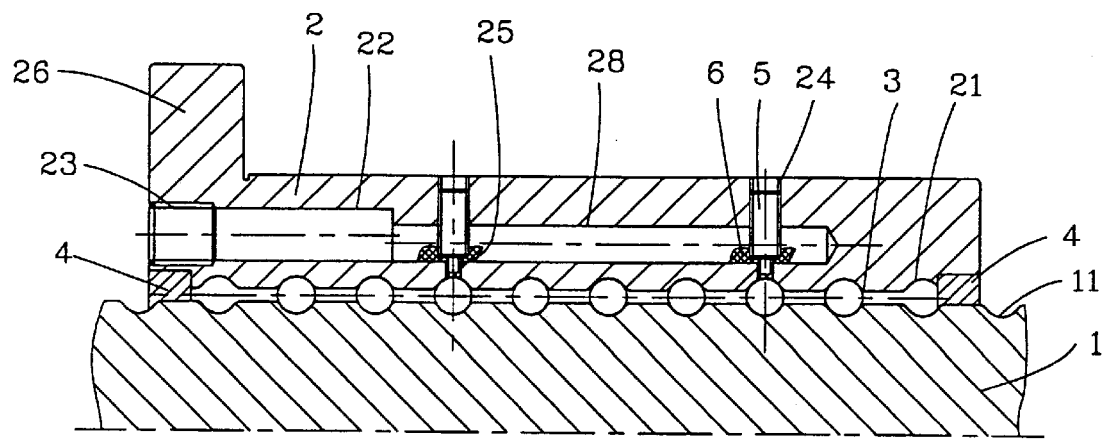
FIG. 5 is a drawing of the screw bolt and nut with lubricant oil contained ball bush bearing in a fifth embodiment of the present invention.

FIG. 5 is a drawing of a fifth embodiment of the present invention which is a modification of the fourth embodiment shown in FIG. 4. Here, for the convenience of arrangement, the deep oil storage hole 22 and the oil dripping hole 25 are arranged eccentric.

Figure 6:
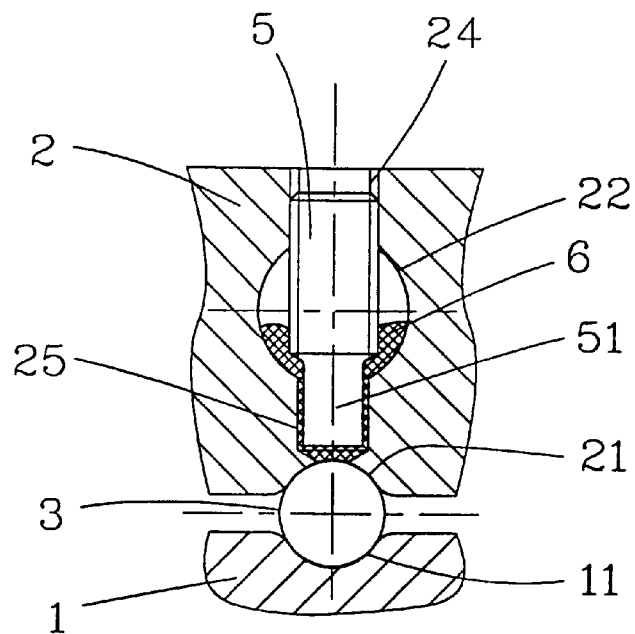
FIG. 6 is a cross sectional view cut along line Q—Q of FIG. 1 shown as example 1.

FIG. 6 is a cross sectional view cut along line Q—Q of FIG. 1 shown as example 1. As shown in the drawing, by adjusting the head 51 of the oil adjusting screw 5 in the oil dripping hole 25, the distance between the oil adjusting screw 5 and the deep oil storage hole 22 is changed. As a result, the flow rate of lubricant oil into the spiral grooves 11, 21 can be controlled.

Figure 7:
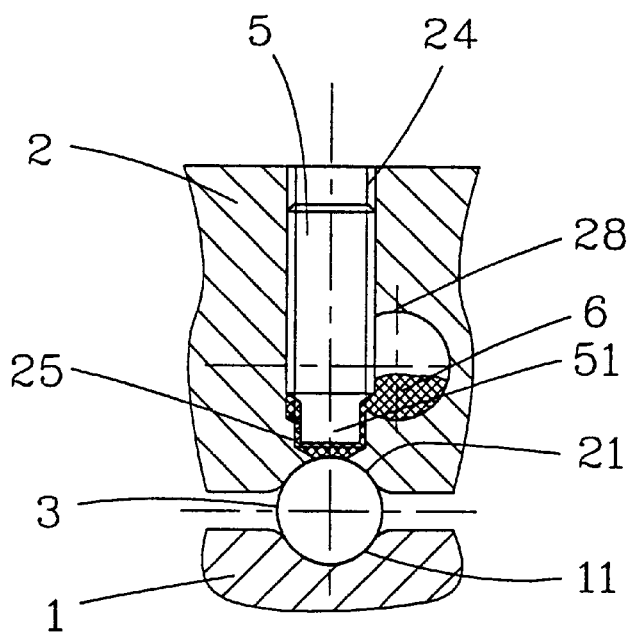
FIG. 7 is a cross sectional view cut along line Q—Q of FIG. 1 shown as example 2.

FIG. 7 is a cross sectional view cut along line Q—Q of FIG. 1 shown as example 2. The oil dripping hole 25 has a conical lower end. When the oil adjusting screw is turned up and down to adjust its position, if the head 51 formed at the lower end of the oil adjusting screw 5 thereof is adjusted nearer to the conical end of the oil dripping hole 25, the slower the lubricant oil drips into the spiral grooves 11, 21 from the oil dripping hole 25.

Figure 8:
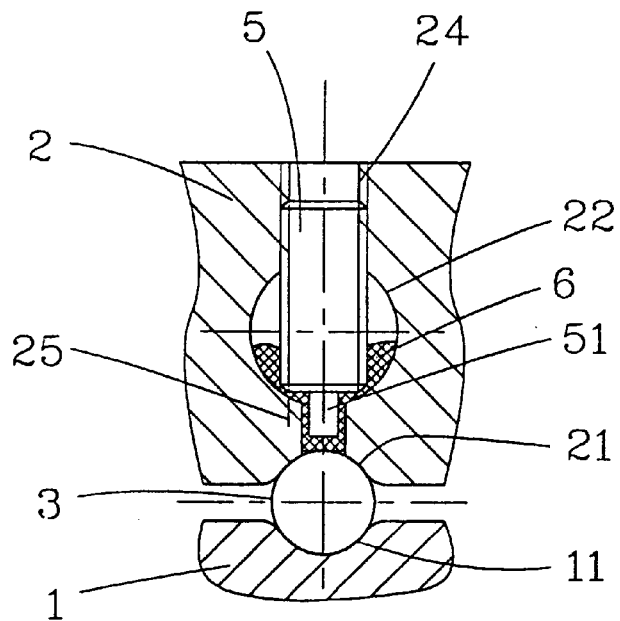
FIG. 8 is a cross sectional view cut along line Q—Q of FIG. 1 shown as example 3.

FIG. 8 is a cross sectional view cut along line Q—Q of FIG. 1 shown as example 3. In this drawing the head 51 of the oil adjusting screw 5 is lengthened to be able to reach the conical portion of the oil dripping hole 25. As a result, the flow rate of the lubricant oil into the ball bush bearing is controlled.

Figure 9:
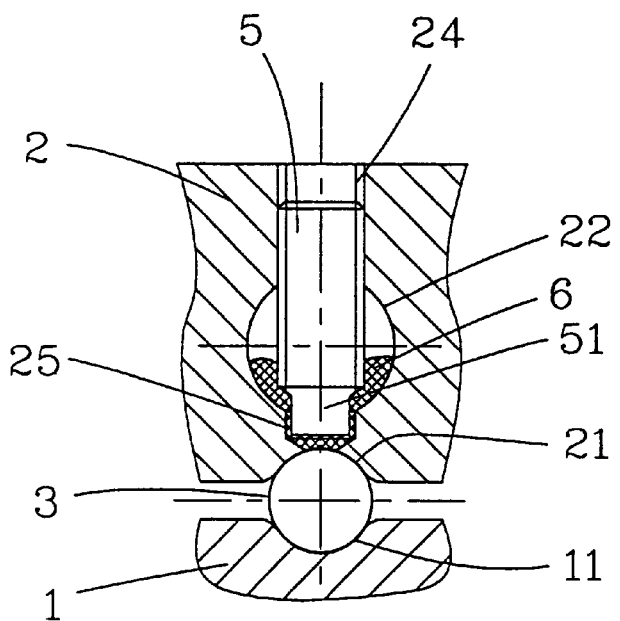
FIG. 9 is a cross sectional view cut along line P—P of FIG. 4.

FIG. 9 is cross sectional view cut along line P—P of FIG. 4. In the drawing it is seen that an oil guide hole 28 has a comparatively small diameter. In order to prevent unwelcome choking of oil flow into a second oil dripping hole by the oil adjusting screw 5, it is so arranged that the oil dripping hole 25 is not passing through the center of the oil guide hole 28.

A convenient screw bolt and nut with lubricant oil contained ball bush bearing is constructed as such.

Many changes and modifications in the above described embodiments of the invention can, of course, be carried out without departing from the scope thereof. Accordingly, to promote the progress in science and the useful arts, the invention is disclosed and is intended to be limited only by the scope of the appended claims.

What is claimed is:

1. A screw bolt, screw nut and ball bearing assembly with lubricant oil contained therein comprising:

a screw bolt having an outer surface and a spiral groove with a semi-circular cross section formed on said outer surface;

a screw nut having a one piece main body and an inner surface including a spiral groove having a semi-circular cross section formed on said inner surface and said spiral groove on said inner surface corresponding to said spiral groove on said screw bolt;

said main body of said screw nut defining a hollow opening for receiving said screw bolt therein;

a plurality of ball bearings disposed between said spiral grooves of said screw nut and said screw bolt within said main body;

a longitudinally extending lubricant oil storage chamber with an open and a closed end formed in said screw nut and extending parallel to the axial direction of said screw bolt;

a seal element to prevent leakage of lubricant oil from said chamber disposed in said open end of said storage chamber;

an oil dripping passage extending perpendicular to said longitudinally extending storage chamber connecting said storage chamber to said spiral groove in said screw nut;

an adjusting screw disposed in said main body for adjusting the flow rate of lubricant oil through said oil dripping passage; and wherein said longitudinally extending lubricant oil storage chamber includes a first portion having a first diameter near said open end and a second longer portion with a smaller diameter extending to said closed end.

2. A screw bolt, screw nut and ball bearing assembly with lubricant oil contained therein according to claim 1 which includes a second oil dripping passage.

3. A screw bolt, screw nut and ball bearing assembly with lubricant oil contained therein according to claim 2, in which said second portion of said lubricant oil storage chamber is concentric with said first portion of said lubricant oil storage chamber.

4. A screw bolt, screw nut and ball bearing assembly with lubricant oil contained therein according to claim 2, in which said second portion of said lubricant oil storage chamber is eccentric with said first portion of said lubricant oil storage chamber.

5. A screw bolt, screw nut and ball bearing assembly with lubricant oil contained therein in accordance with claim 2, which includes an oil containing member of felt, wool or cotton disposed in said oil dripping passages.

6. A screw bolt, screw nut and ball bearing assembly with lubricant oil contained therein in accordance with claim 5, which includes a scraping ring at each end surface of said nut to remove foreign material.

* * * * *